(No Model.)

A. WAGNER.
APPARATUS FOR MEASURING FOCAL LENGTHS OF LENSES.

No. 342,149. Patented May 18, 1886.

WITNESSES:
L. Douville
W. F. Kirchen

INVENTOR:
Anton Wagner
BY John A. Wiedersheim
ATTORNEY.

N. PETERS, Photo-Lithographer, Washington, D. C.

United States Patent Office.

ANTON WAGNER, OF PHILADELPHIA, PENNSYLVANIA.

APPARATUS FOR MEASURING FOCAL LENGTHS OF LENSES.

SPECIFICATION forming part of Letters Patent No. 342,149, dated May 18, 1886.

Application filed February 18, 1886. Serial No. 192,321. (No model.)

*To all whom it may concern:*

Be it known that I, ANTON WAGNER, a subject of the King of Bavaria, having resided one year last past in the United States, and made oath of intention to become a citizen thereof, a resident of the city and county of Philadelphia, State of Pennsylvania, have invented a new and useful Improvement in Apparatus for Measuring the Focal Lengths of Optical Lenses, which improvement is fully set forth in the following specification and accompanying drawings, in which—

Figure 1:
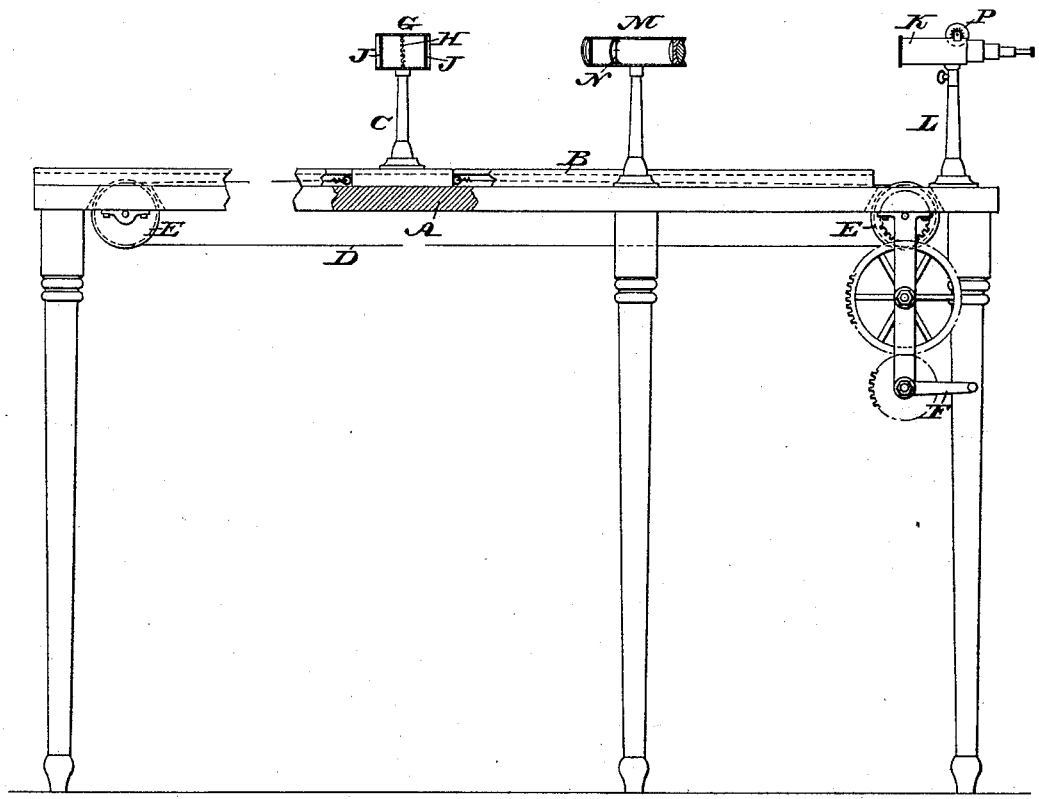
Figure 2:
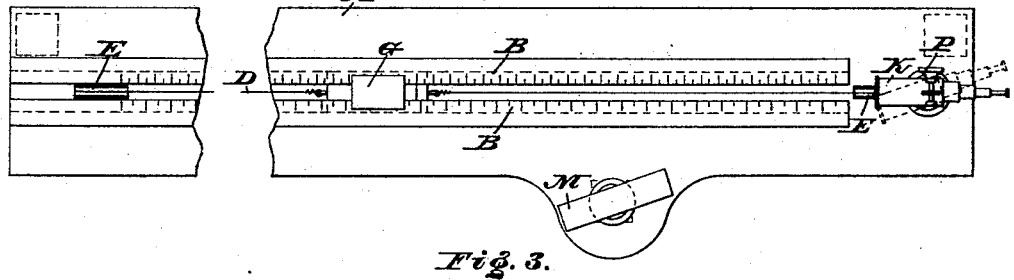
Figure 3:
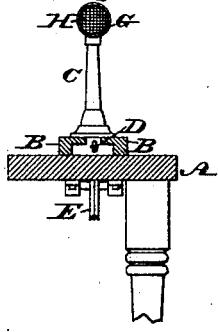

Figure 1 represents a partial side elevation and partial vertical section of an apparatus for measuring optical lenses embodying my invention. Fig. 2 represents a top or plan view thereof. Fig. 3 represents a vertical section thereof.

Similar letters of reference indicate corresponding parts in the several figures.

My invention consists of an apparatus for measuring the focal lengths of optical lenses embodying a telescope or field-glass, a holder for a lens having a spider-line, and an adjustable object-holder, whereby the focus of a lens may be indicated, as will be hereinafter fully set forth.

Referring to the drawings, A represents a table having on its upper face a scale, B, which is graduated in feet and inches or meters.

C represents a standard, which is fitted to the table A and movable thereon, its base sliding over the scale B, and having connected with it an endless band or cord, D, which is passed around pulleys E, mounted on opposite ends of the table A. One of the pulleys is rotated by means of a crank-handle, F, which is connected with one of the wheels of the gearing, which meshes with a pinion secured to said pulley, whereby motion may be imparted to the cords D in opposite directions.

Secured to the standard C is a horizontally-arranged cylinder, G, within which is secured a disk of gauze or netting, H, the ends of the cylinder being closed by disks of glass, J, whereby dust and dirt are prevented from reaching the netting.

Supported on one end of the table is a telescope or field-glass, K, which is swiveled to a standard, L, resting on the table, and laterally movable, so as to be directed toward the gauze-holder G, and also to a lens-holder, M, which is also supported on the table at the side thereof, and diagonally arranged, said holder containing lens and a "spider-line," N, it being noticed that the gauze-holder may be moved nearer to or farther from the glass K, so as to be adjusted in relation thereto, for purposes to be hereinafter explained.

The operation is as follows: The lens, the focal length of which is to be ascertained, is placed in the holder M, and the glass K so adjusted that the spider-thread is plainly seen. The glass K is now directed to the gauze G in the cylinder H, and the latter is moved by means of the band D and pulleys E, so that the said gauze is plainly visible, when the distance thereof marked on the scale B can be read, which distance is the focal length of the said lens.

Having thus described my invention, what I claim as new, and desire to secure by Letters Patent, is—

1. An apparatus for measuring optical lenses having a field-glass or telescope, a holder for a lens and spider-line, an adjustable object-holder, and a scale, substantially as described.

2. A table with a scale, an adjustable object-holder mounted thereon, and a field-glass or telescope, and a holder for a lens and spider-line, combined and operating substantially as described.

3. An optometer consisting of a slotted frame having a scale marked thereon, a lens-holder having a spider-thread, a gauze-holder supported by a standard adapted to move in said slot, a belt connected to said standard, a pulley, and mechanism, substantially as described, for operating said pulley, and a field-glass, all arranged, combined, and operating substantially as and for the purpose set forth.

ANTON WAGNER.

Witnesses:
JOHN A. WIEDERSHEIM,
A. P. GRANT.